Aug. 19, 1930. A. DINA 1,773,575
OPTICAL SYSTEM OF MOTION PICTURE PROJECTION MACHINES
Filed Oct. 13, 1928 3 Sheets-Sheet 1
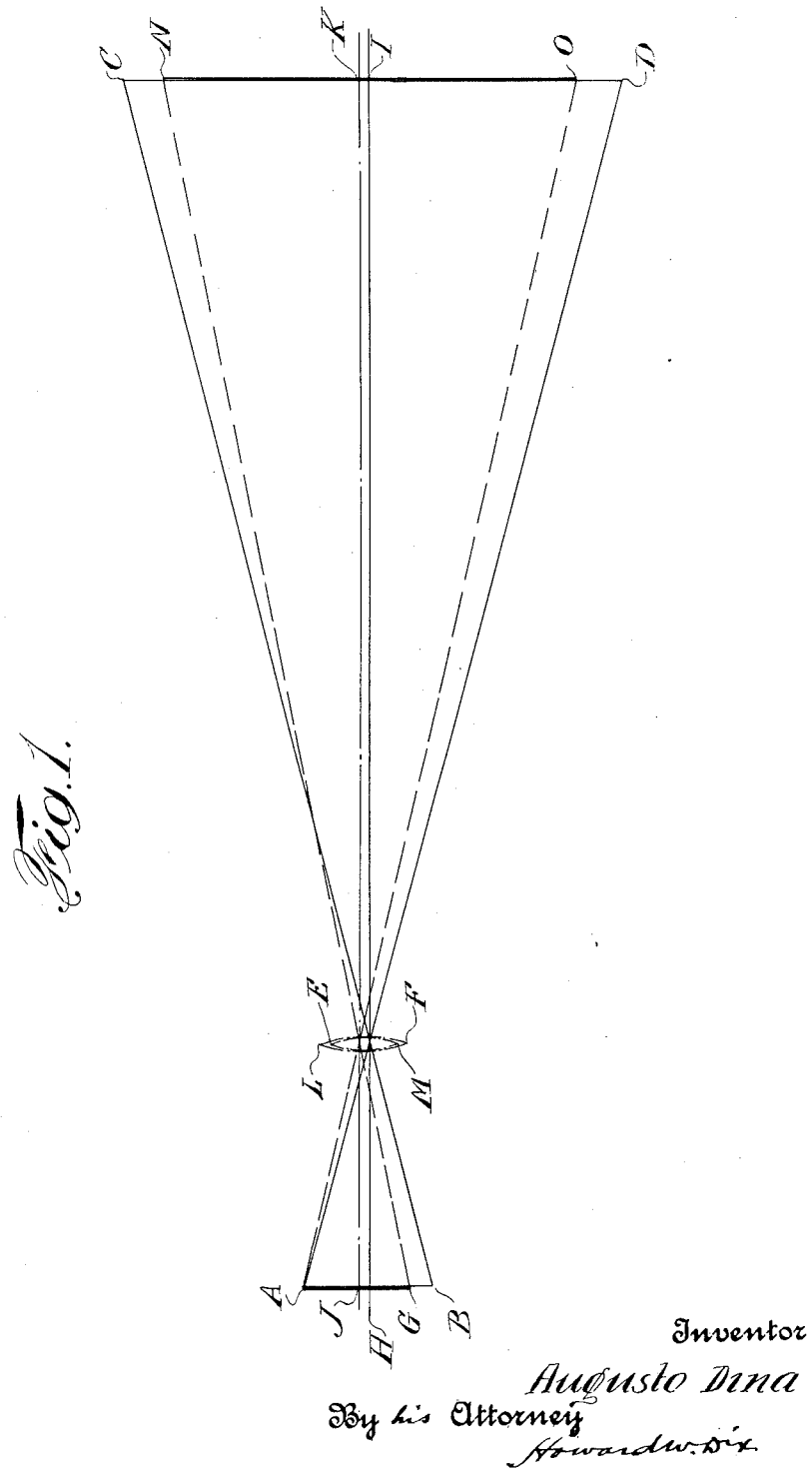

Aug. 19, 1930.  A. DINA  1,773,575
OPTICAL SYSTEM OF MOTION PICTURE PROJECTION MACHINES
Filed Oct. 13, 1928  3 Sheets-Sheet 2
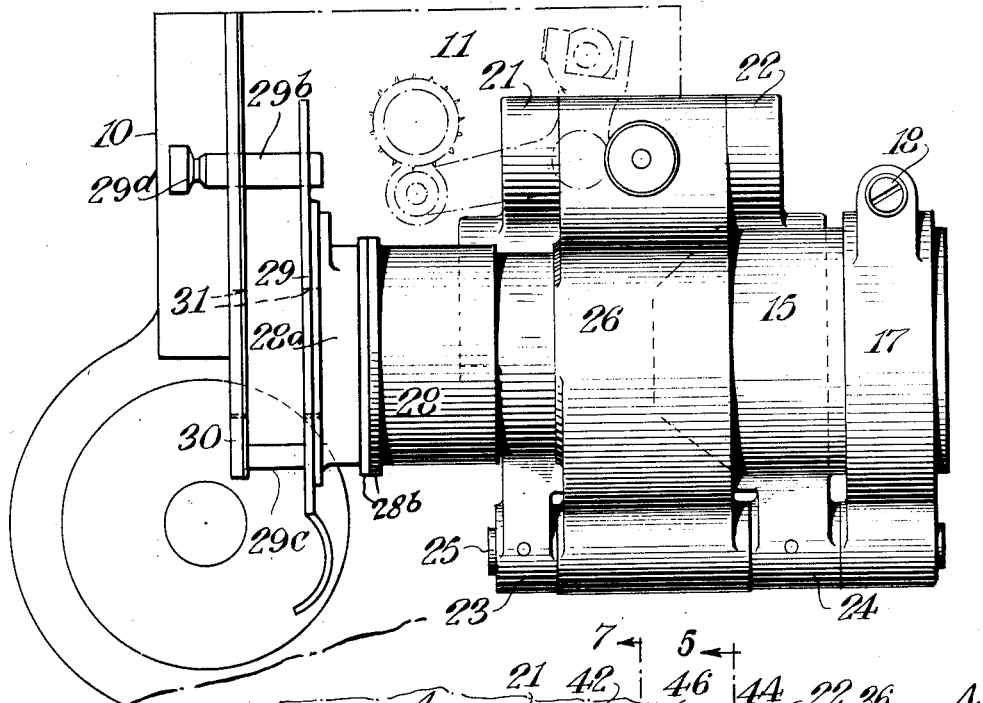
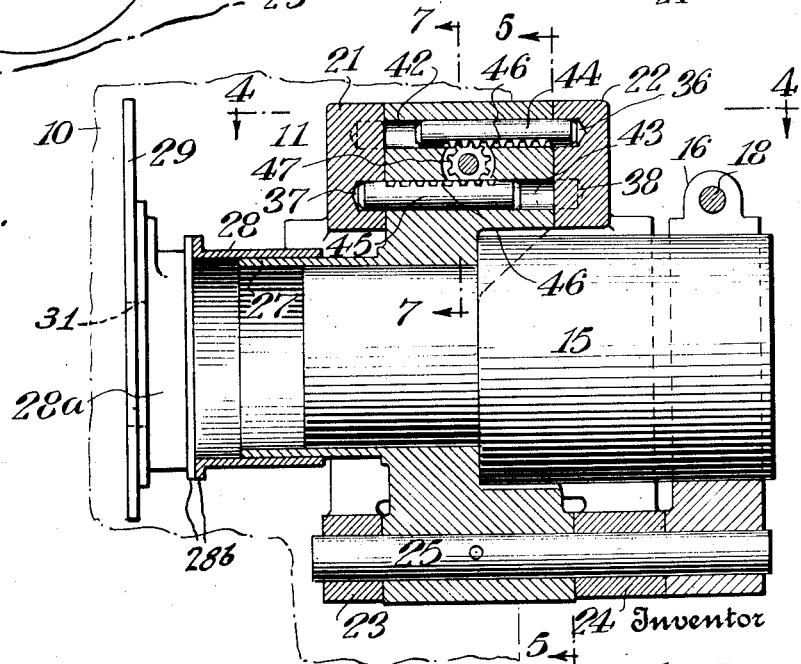

Aug. 19, 1930.  A. DINA  1,773,575
OPTICAL SYSTEM OF MOTION PICTURE PROJECTION MACHINES
Filed Oct. 13, 1928  3 Sheets-Sheet 3
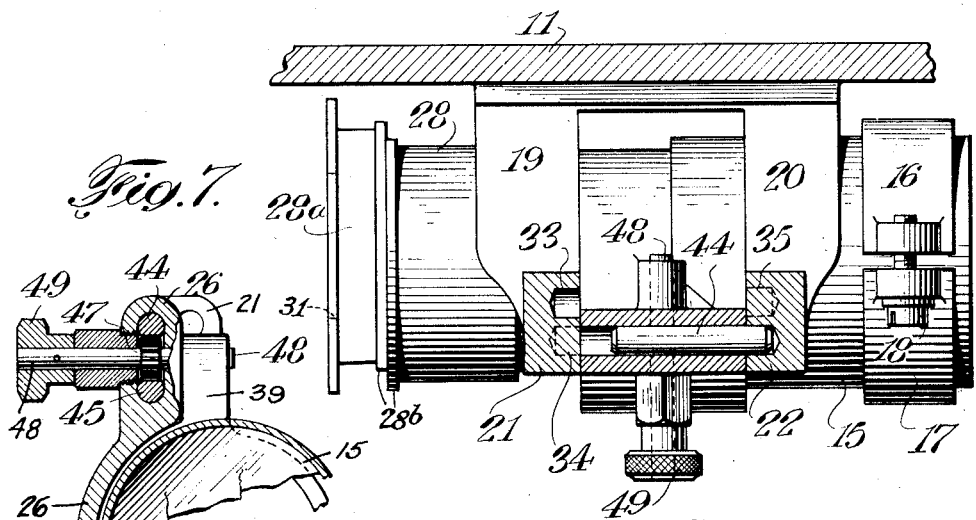
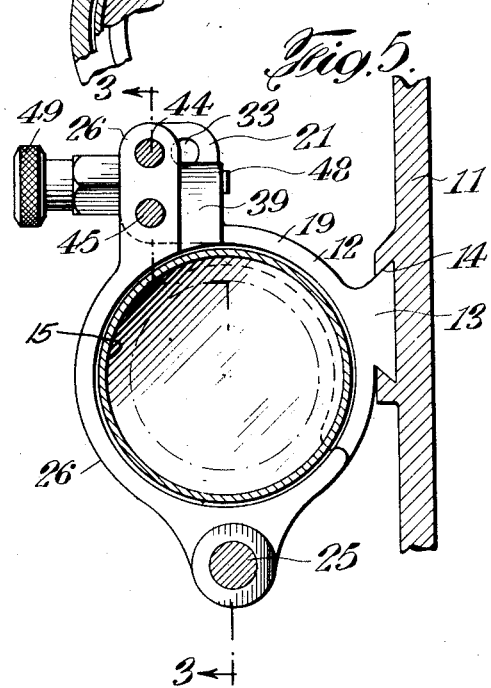
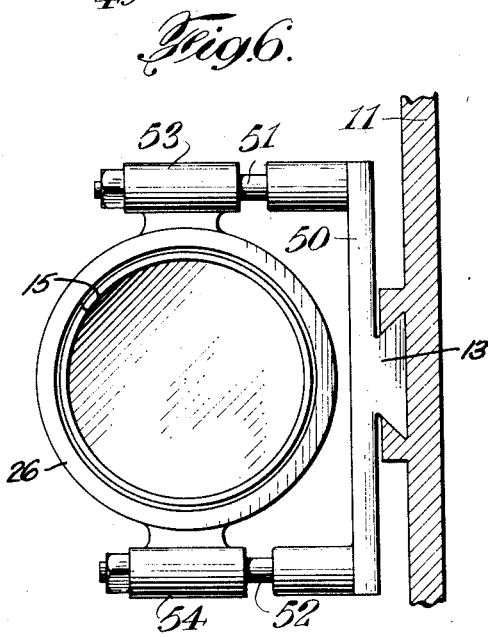
Inventor
Augusto Dina
By his Attorney Patented Aug. 19, 1930

1,773,575

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

OPTICAL SYSTEM OF MOTION-PICTURE-PROJECTION MACHINES

Application filed October 13, 1928. Serial No. 312,373.

This invention relates to motion picture apparatus and has particular reference to motion picture projectors whereby a single projector may be readily adapted for use with more than one type of moving picture film.

In the operation of the well known film projection machines with the ordinary or old type of film, the successive exposures of the film are moved past the film aperture and are successively registered therewith. In this case the light beam thrown on the film is centered with respect to the film, and after passing therethrough, passes through an optical system which is axially centered therewith. The light rays then pass to the screen. Thus, in ordinary projection, the center of the light beam coincides successively with the center of the film, the center of the lens system, and the center of the screen.

When a film is used which has along one edge striata for the purpose of producing sounds in synchronism with the picture sections, the area of the film devoted to the picture itself is reduced in size, usually by cutting down its width and therefore the new center of each exposure is shifted to one side of the usual one. Thus, as is illustrated in the drawings, the original areas of the picture sections on the film may be modified, although only slightly, to provide for the striata along a border of each section. Consequently, the axis of projection of the modified section is along a line slightly displaced from the line occupied by the axis of projection of the original or normal full size section. Usually that portion of the film aperture occupied by the striata above mentioned is covered to prevent the picture projecting light from passing therethrough. With the lens system in its usual axial alinement with the center of the full film aperture, it will be apparent that its axis will not coincide with that of the newer or smaller picture section, and displacement of the picture on the screen will therefore result.

It is an object of this invention to provide a simple, durable, and efficient means whereby the alinement previously referred to may be readily maintained whether the standard film is employed or the one above mentioned on which the sound striata are photographically produced and in which the area occupied by the picture itself is consequently shifted to one side of the film aperture.

It is a further object of the invention to provide a device for the purpose mentioned which may be readily and economically produced and may be easily adjusted by the operator even when the machine is in operation.

Further and more specific objects, features, and advantages will more clearly appear from the detailed description given below taken in connection with the accompanying drawings which form part of the specification, which illustrate one or more forms which the invention may practically assume, and in which, Fig. 1, is a diagram, in plan, of the application of my invention to the projection of pictures either through a standard film or through a modified film, Fig. 2, is a side elevation of that portion of a projector to which the device constituting my invention is applied, Fig. 3, is a vertical longitudinal section taken on the line 3—3 of Fig. 5, Fig. 4, is a horizontal section taken on the line 4—4 of Fig. 3, Fig. 5, is a vertical transverse section taken on the line 5—5 of Fig. 3, Fig. 6, is an end elevation of a modified form which the invention may assume, and Fig. 7, is a partial vertical transverse section taken on the line 7—7 of Fig. 3.

Considering Fig. 1, which is a diagram in plan view, the width of the usual standard film is designated A—B, and the width of the picture thrown on the screen therefrom is lettered C—D. The usual position of the lens system or combination, in this diagram as represented by a single lens, is lettered E—F, and is in full lines.

When the modified film above referred to is employed, the width of its picture portion or exposure is less than the width of the standard film and is lettered A—G. It is generally shifted to one side of the film and consequently its center is shifted to one side. The normal center line is lettered H—I, and extends from the center of the standard film to the center of the screen. The center line from the center of the modified film section is parallel to the normal center line and is lettered J—K. If the width reduction in the standard film due to the sound striata lettered G—B, is one half inch, the amount by which the center of the modified film is shifted from the normal center is about one quarter of an inch.

If projection of the modified film is made with the lens in its usual position E—F, then the picture on the screen will be displaced due to the axial optical disalinement, but if the lens system is shifted to a position lettered L—M, then the picture thrown on the screen and lettered N—O, will be slightly smaller than the usual picture but will be undisplaced. In this arrangement therefore, the axial center of the lens L—M will coincide with the center line J—K extending from the center of the modified picture section A—G to the slightly shifted center on the screen and lettered K.

A preferred form of structure whereby the invention thus diagrammatically explained is practically applied to a motion picture machine, is shown in Figs. 2, 3, 4, 5, and 7. In these figures, the usual projection head of the machine is represented at 10 as having a vertical longitudinal wall 11 on which a lens supporting frame 12 is suitably mounted for longitudinal adjustment. This frame 12 has a dove-tail tongue 13 which is adapted to slide in a reversely shaped groove 14 on the wall 11. By this connection the frame 12 may be adjusted to focus the lens system such as 15 which is clamped on the front of the frame 12 in between supporting means such as curved plates 16 and 17 by means of an adjusting screw 18. The frame 12 preferably carries a pair of yoke shaped arms 19 and 20 which are spaced apart and rigidly connected to the frame. These arms are preferably curved and have upper and lower projecting portions 21, 22, 23, 24 respectively. Extending between the lower portions 23, 24 is a shaft 25 pinned thereto. On this shaft 25 between the arms 19 and 20 is disposed an arm 26 pivotally mounted on the shaft 25 and carrying the telescopic tubes 27 and 28 disposed in alinement with the lens system 15, which is supported in the arms 16 and 17 and is also pivotally mounted on the shaft 25. If desired, light tubes 27 and 28 and the tube carrying the lens system 15 may be replaced by a single series of tubes, some of which are telescopically related to others.

The tube 28 is slidable with respect to the tube 27 and at its end is adapted to bear against a separate tubular section 28$^a$, normally axially alined therewith, and carried by a film trap door 29 which also supports the film presser feet. The light tubes 28 and 28$^a$ are on adjacent faces thickened or flanged as at 28$^b$ so as to provide ample contact area therebetween and prevent a break in the continuity of the passage thus formed even though the tube 28 is laterally and slightly shifted to shift the lens system. Thus, no light is allowed to stray from the tube, and therefore the hot light rays are all confined within the tube and are not allowed to reach the outside and contact with the film as it passes through the projection head, whereby any further fire risk is eliminated. This door 29 is longitudinally slidable on pins 29$^b$ and 29$^c$ to permit the withdrawal of the door 29 from the shoe 30 to allow threading of the film and is thus operated by means of a head 29$^d$ on the other side of the film trap shoe 30. The door is thus movable to bear against a film extending down between it and the shoe 30. The shoe 30 and door have the usual film apertures 31 therein. By having a section of the light confining tube carried by the film trap door 29, the other sections 27 and 28 of the tube can be laterally displaced slightly without disturbing the function of the tube as a whole. When the tube sections 27 and 28 are displaced the end of the section 28 will slide over the face of the section 28$^a$ to the slightly displaced position shown in Fig. 2. Thus, although one portion of the tube is laterally movable the function of the tube is preserved.

The upper ends 21, 22 of the arms 19 and 20 are provided with pairs of spaced holes 33, 34, and 35, 36 on one level and similar pairs of holes 37, 38 and 39, 40 on a lower level as shown in Figs. 3, 4, and 5. The upper end of the arm 26 is provided with two bores 42 and 43 on upper and lower levels in which pins 44 and 45 slide. These pins are, on adjacent faces, provided with rack teeth 46 adapted to mesh with teeth on a pinion 47 disposed therebetween on a stub shaft 48 extending transversely through the upper end of the arm 26 and having a head 49 whereby it is capable of being manipulated. When the head 49 is moved in one direction, the pins 44 and 45 are moved in directions opposite to each other and when the head 49 is moved in the other direction, the pins direction of movement is reversed. The pins are adapted to be projected into the holes 33—40 above mentioned and thus lock the lens system 15 and arm 26 in a desired position with respect to the arms 19 and 20. With the pins withdrawn from the holes, the arm 26 and the lens arms 16 and 17, all fastened to the shaft 25 are capable of being moved therewith to move the lenses laterally with respect to the film aperture 32. Thus, the lens system or combination may be moved to or from the wall 11.

When the lenses are in the desired position, with their axis either in the normal or the laterally displaced position, the pins are operated to lock the arm 26 in this position. For example, with the arm 26 in either position, to move it to the other position, it is merely necessary to start turning the head 49 which during the first part of its movement will release the pins. Then the arm may be moved laterally to the other position to newly aline the lens system, while the head 49 may either be moved backwardly or continued in its former movement to relock the pins with the new set of holes. In either position of the lens support, it is obvious that the lens system can be moved longitudinally to focus the lens system, the action of the one adjustment not being dependent on the action or position of the other adjustment.

In the form of the invention shown in Fig. 6, the lens frame 50 is slidably mounted on the wall 11 as before but in this case it has a plurality of horizontally projecting arms such as 51 and 52 on which slide sleeves 53 and 54 are connected to the lens combination members so that the lenses may be moved by a sidewise sliding movement rather than by a lateral pivotal movement as before. In the pivotal movement of the lens support, the two extreme positions of the support are on opposite sides of the high point of the arc of movement so that in the extreme positions the lenses are at the same vertical distance from the shaft 25.

From the foregoing disclosures, it will be apparent that there is provided a simple, and efficient device for so moving the lens system as to always maintain or place the lenses in alinement with the axis of projection even when that axis is necessarily slightly shifted due to the projection of a picture having a slightly modified outline, such as the movietone film, instead of the normal size picture. This movement and maintenance of the optical system is achieved by the slight shifting in the proper and desired direction of the lens support either in whole or in part, and furthermore includes means whereby the lens can be locked in either position and focussed independently of the shifting device by suitable lens sliding means for moving the frame 12 along the wall 11.

It is clear that although the apparatus is usually so disposed that the film moves in a vertical direction and the shifting of the lens is therefore generally in a substantially horizontal direction, this relation of direction can be changed since it is possible that the position of the apparatus may be changed so that the film will run in any other direction. It is also clear that this invention will apply equally well to machines other than projectors where a film moves therethrough in front of an aperture. In such a machine the lens system with respect to the film and the aperture must always be in line with the projection axis of the picture.

The means for changing the aperture size, although not shown, may be any suitable means, such as the type of slide plate shown and described in my copending application Serial 305,386, filed Sept. 12, 1928, entitled "Aperture plates for motion picture projecting machines", see particularly Figs. 8 and 9 and the description thereof.

It is well known that masking plates have been employed to cover or block off a material portion of a film where only a small section thereof is to be projected. The films for such partial projection are usually those having several rows of picture sections, only one row of which is to be projected at a time. It will thus be seen that the size of aperture selected was for the particular row to be projected whether the size thus selected was for a normal section or another size of section. It will be clearly noted however that when a given size of aperture was selected to permit projection of a desired size of picture section, no means has thus far been disclosed to permit that selected aperture to be slightly modified.

When the problem was encountered of employing a film, a small portion of which was occupied by images, such, for example, as sound striata for movietone purposes, the necessity of slightly modifying the area of the otherwise normal selected aperture arose. This modification is effected in one instance by employing the slide plate disclosed in my application above mentioned. Since this change in area of the selected opening is unsymmetrical and preferably is effected by blocking off an edge strip of the opening, the center of projection of the resultant area is slightly displaced from the center of projection of the full size selected opening. Therefore the lens system which is normally axially alined with one center of projection is provided with means to shift it to aline it with the other center.

Any size aperture selected for the projection of a row of pictures will be considered as a normal size aperture, whether that size be the present standard 35 m. m. film or the ordinary smaller or larger size films.

While the improvement has been described in detail and with respect to a preferred form thereof, it is to be understood that it is not to be limited to such details or form, since many changes and modifications may be made and the invention is capable of being embodied in other forms without departing from the spirit and scope of the invention in its broader aspects. Hence it is desired to cover all modifications and forms coming within the language or scope of any one or more of the appended claims.

What is claimed is:—

1. In a motion picture apparatus adapted to have a film passed therethrough for projection of a single row of picture sections thereon, said apparatus being provided with any selected sized aperture capable of being slightly modified unsymmetrically and without carrying the center of projection to another row of picture sections, a lens in said apparatus in optical alinement with the center of projection through said selected aperture, a support for said lens, said support being shiftably mounted in said apparatus, and means for moving said support and lens to a new optical axis created by thus modifying said selected aperture.

2. In a motion picture apparatus adapted to have a film passed therethrough for projection of a single row of picture sections thereon, said apparatus being provided with any selected sized aperture capable of being slightly modified unsymmetrically and without carrying the center of projection to another row of picture sections, a lens in said apparatus in optical alinement with the center of projection through said selected aperture, a support for said lens, said support being shiftably mounted in said apparatus, and means for moving said support and lens to a new optical axis created by thus modifying said selected aperture, and means for positively holding said support in either position.

3. In a motion picture apparatus having a selected projection aperture, said aperture adapted to be modified unsymmetrically in size by blocking off an edge strip portion thereof, a projection lens, a support adjustably mounted for holding said lens, said support and lens adapted to be positioned in optical alinement with the center of projection of a picture requiring the full size selected aperture and means for moving said support to shift the lens a distance equal to one half the width of the edge strip portion for projecting a picture requiring the modified size of aperture.

4. In a motion picture apparatus adapted to have a film passed therethrough for projection, said film comprising picture sections only or picture sections and other records, a lens alined with the center of projection of said film, a shiftably mounted support for said lens, said apparatus adapted to have the aperture modified by blocking off an edge strip thereof to prevent the projection of said edge strip, said edge strip having thereon the images or records other than picture images, said support being provided with means for shifting it to aline said lens with the new center of projection.

5. In a motion picture apparatus having a normal aperture in which normal sized film sections or movietone size film sections may be presented, a projection lens, a lens support shiftably mounted for alining said lens axially with the center of the normal aperture, said normal aperture capable of being modified when movietone sections are presented therein, and means for shifting said support to aline the lens with the thus modified aperture.

6. In a motion picture apparatus, a projection lens, a frame mounted on said apparatus, a support in said frame for said lens, said frame being movably mounted in said apparatus for permitting the focussing of the lens, said apparatus being provided with an aperture for projecting normal size film said same aperture capable of being modified to project movietone film, and means on said support for moving it and the lens in a direction at right angles to the focussing movement from alinement with the center of one size aperture to alinement with the center of the other size aperture.

7. In a motion picture apparatus, a projection lens, a frame mounted in said apparatus, a support on said frame for said lens, said frame being movably mounted in said apparatus for permitting focussing of the lens, said apparatus being provided with an aperture for projecting normal size film, said same aperture capable of being modified to project movietone film, means for moving the lens in a direction at right angles to the focussing movement from alinement with the center of one size aperture to alinement with the center of the other size aperture, and means for positively holding the lens in either position.

8. In a motion picture apparatus, a projection lens, a frame mounted on said apparatus, a support on said frame for said lens, said frame being movably mounted in said apparatus for permitting focussing of the lens, means for moving said support to shift the lens from alinement with the optical axis for the projection of normal size film to alinement with a slightly shifted axis for the projection of movietone size film, the distance between the axes being less than one half the diameter of said lens.

9. In a motion picture apparatus, a projection lens, a frame mounted in said apparatus, a support on said frame for said lens, said frame being movably mounted in the apparatus for permitting focussing of the lens, means for moving said support to shift the lens from alinement with the optical axis for the projection of normal size film to alinement with a slightly shifted axis for the projection of movietone size film, the distance between the axes being less than one half the diameter of said lens, and means for positively holding the lens in either position.

10. In a motion picture apparatus having a film aperture, a light tube section alined with said aperture, a second light tube section normally alined with the first section and shiftable laterally to the normal axis and to the first section, and cooperating means on the adjacent ends of said sections to prevent egress of light from the tubes while permitting relative shifting between said sections.

11. In a motion picture apparatus having a film aperture, a door for pressing a passing film in front of said aperture, a series of tube sections extending from said door through said machine to form a light enclosure for the projection light, said sections assembled to allow movement of the said door for threading a film through said apparatus, one of said sections being mounted on said door, another of said sections carrying a projection lens, means for shiftably supporting the sections other than the one carried on said door to allow movement of said lens to a second projection position which is substantially lateral to the assembled projection position, and cooperating means between the first section and the section adjoining to prevent egress of light from the tubes in any of their relative positions.

12. In a motion picture apparatus having a film aperture, a film trap door adjacent said aperture and adjustable longitudinally with respect thereto, a light tube carried by said door, a lens tube normally alined with the axis of the light tube, an intermediate tube telescopically associated with said lens tube and adapted to be extended into engagement with the light tube on said door, and means for shifting said lens tube and said intermediate tube laterally to the normal axis of projection while the intermediate tube and the light tube are in contact, the contacting of the parts preventing egress of light from the tubes while being shifted.

13. A motion picture projector having a normal aperture, the effective size of said aperture capable of being modified to permit projection of movietone film through said projector, a lens supported in alinement with the center of the normal aperture, means to shift the lens to aline it with the center of the aperture as modified, said lens capable of being focussed in either alined position.

AUGUSTO DINA.